United States Patent [19]

Krause et al.

[11] Patent Number: 6,160,799
[45] Date of Patent: *Dec. 12, 2000

[54] METHOD OF AND APPARATUS FOR PILOT SET MAINTENANCE

[75] Inventors: David J. Krause, Hainesville; Brian D. Storm, Round Lake Beach; William F. Taranowski, Vernon Hills; Michael A. Eberhardt, Hanover Park, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/709,432

[22] Filed: Sep. 6, 1996

[51] Int. Cl.[7] .................................................. H04Q 7/38
[52] U.S. Cl. ........................................... 370/335; 370/342
[58] Field of Search ................................... 370/252, 311, 370/335, 342, 441, 479, 514, 515; 375/367, 147, 316, 349; 455/434, 436, 32.1, 442

[56] References Cited

U.S. PATENT DOCUMENTS

| | | | |
|---|---|---|---|
| 5,101,501 | 3/1992 | Gilhousen et al. | 455/33 |
| 5,109,390 | 4/1992 | Gilhousen et al. | 375/1 |
| 5,267,261 | 11/1993 | Blakeney, II et al. | 370/332 |
| 5,392,287 | 2/1995 | Tiedemann, Jr. et al. | 375/95.1 |
| 5,490,165 | 2/1996 | Blakeney, II et al. | 375/205 |
| 5,509,015 | 4/1996 | Tiedemann, Jr. et al. | 370/95.3 |
| 5,577,022 | 11/1996 | Padovani et al. | 370/332 |
| 5,680,395 | 10/1997 | Weaver, Jr. et al. | 370/331 |

FOREIGN PATENT DOCUMENTS

WO 96/16524   5/1996   WIPO .

*Primary Examiner*—Ricky Ngo
*Attorney, Agent, or Firm*—Donald C. Kordich; Lalita P. Williams

[57] ABSTRACT

An apparatus (100) maintains a Pilot Set in a digital communication system that utilizes Code Division Multiple Access. The apparatus comprises a logic and control circuit (113) for providing instructions to a searcher receiver (109). The searcher receiver, in response to the instructions, sequentially scans active pilots, then candidate pilots, and then pre-candidate pilots. The scan of the pre-candidate pilots continues until all but a predetermined number of pre-candidate pilots have been promoted or demoted. Then the searcher receiver alternately scans the predetermined number of pre-candidate pilots and the neighbor pilots. The searcher receiver terminates alternate scans of the predetermined number of pre-candidate pilots and the neighbor pilots when a one of the neighbor pilots is promoted, and resumes the scan of the pre-candidate pilots.

21 Claims, 2 Drawing Sheets

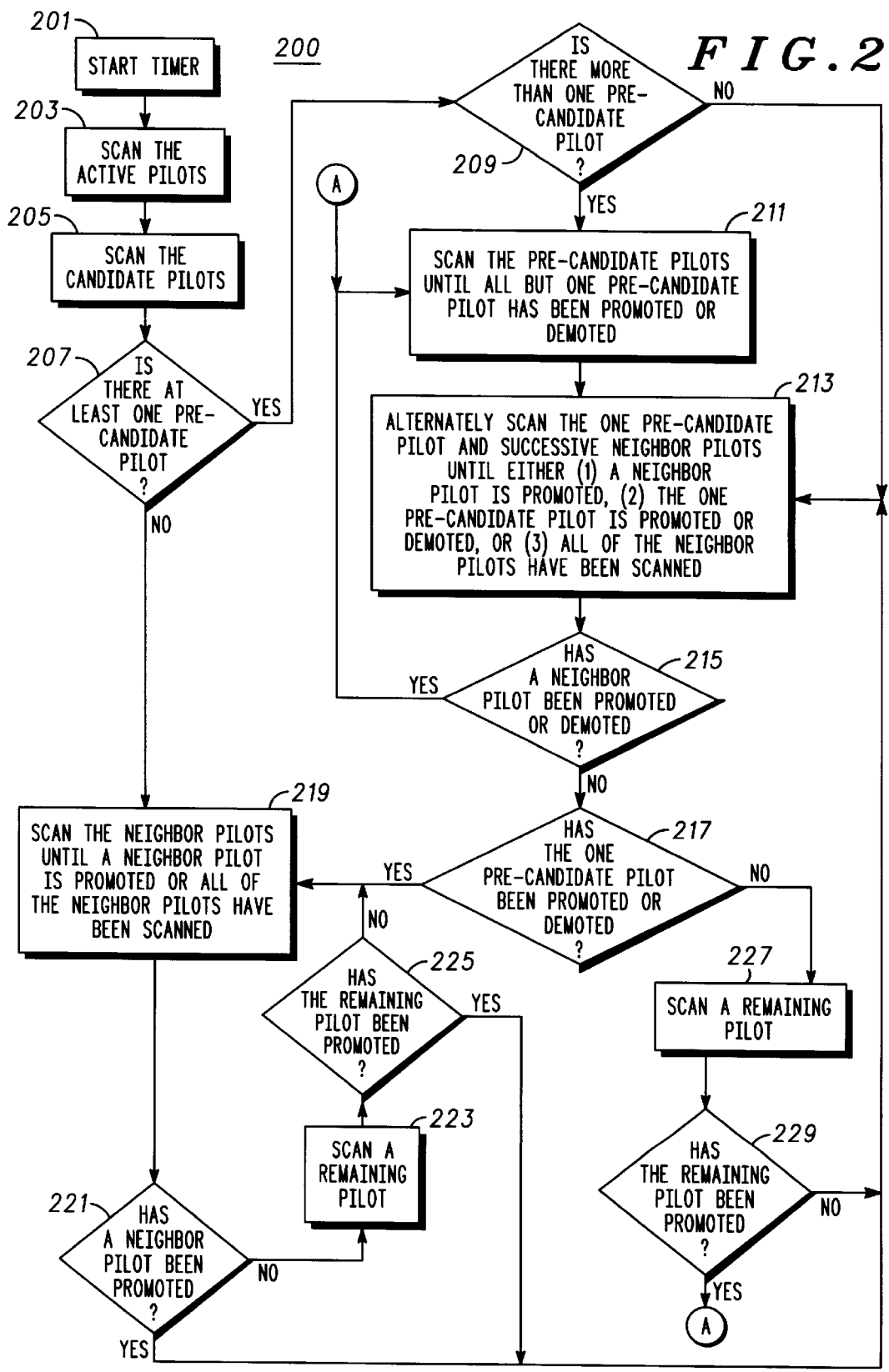

METHOD OF AND APPARATUS FOR PILOT SET MAINTENANCE

FIELD OF THE INVENTION

The present invention relates generally to the field of digital communications, and more particularly to a method of and apparatus for maintaining the Pilot Set in a digital communication system that utilizes Code Division Multiple Access. Although the invention is subject to a wide range of applications, it is especially suited for use in cellular or Personal Communication System (PCS) wireless communication devices, and will be particularly described in that connection.

BACKGROUND OF THE INVENTION

Interim Standard IS-95-A (IS-95) has been adopted by the Telecommunications Industry Association for implementing CDMA in a cellular system. In the CDMA system, a mobile station communicates with any one or more of a plurality of base stations dispersed in a geographic region. Each base station continuously transmits a pilot channel signal having the same spreading code but with a different code phase offset. Phase offset allows the pilot signals to be distinguished from one another, which in turn allows the base stations to be distinguished. Hereinafter, a pilot signal of a base station will be simply referred to as a pilot. The mobile station monitors the pilots and measures the received energy of the pilots.

When in a call, the base station communicates with the mobile station over Forward Traffic Channels. During the call, the mobile station must constantly monitor and maintain four sets of pilots (collectively referred to as Pilot Set)—the Active Set, the Candidate Set, the Neighbor Set, and the Remaining Set. The Active Set are pilots associated with the Forward Traffic Channels assigned to the mobile station. The Candidate Set are pilots that are not currently in the Active Set but have been received by a particular mobile station with sufficient strength to indicate that the associated Forward Traffic Channels could be successfully demodulated. The Neighbor Set are pilots that are not currently in the Active Set or Candidate Set but are likely candidates for handoff. The Remaining Set are all possible pilots in the current system on the current CDMA frequency assignment, excluding the pilots in the Neighbor Set, the Candidate Set, and the Active Set.

As the mobile station moves from the region covered by one base station to another, the mobile station promotes certain pilots from the Neighbor Set to the Candidate Set, and certain pilots of the Candidate Set are subsequently promoted to the Active Set by the base station. The mobile station notifies the base station or base stations of the promotion from the Neighbor Set to the Candidate Set via a Pilot Strength Measurement Message. The base station notifies the mobile station of the promotion from the Candidate Set to the Active Set via a Handoff Direction Message. The process of continually updating the Pilot Set during a call is referred to as "pilot set maintenance."

A conventional algorithm for determining which pilots to promote to the Candidate Set repeatedly performs the following steps in the order stated as follows: 1) scan all active pilots; 2) scan all candidate pilots; 3) scan one neighbor pilot, or one remaining pilot when the entire Neighbor Set has been scanned. When the measured energy of a neighbor pilot or a remaining pilot is found to be above the a certain threshold T_ADD, the pilot is promoted to the Candidate Set.

A single energy measurement of a pilot is not as very reliable in the presence of Rayleigh fading, and some neighbor or remaining pilots may be promoted when the energy of the neighbor pilot is not above T_ADD. To compensate, a variation of this algorithm specifies a fifth set, called a Pre-candidate Set. The purpose of the Pre-candidate Set is to ensure that the energy of a pilot is above T_ADD before being promoted to the Candidate Set.

The Pre-candidate Set is scanned along with the Candidate Set in the order stated above. When the energy of a neighbor pilot is first found to be above T_ADD, the neighbor pilot is promoted to the Pre-candidate Set instead of directly to the Candidate Set. The base station is not informed about the pre-candidate pilot until it is promoted from the Pre-candidate Set to the Candidate Set.

A pre-candidate pilot is determined to be promotable to the Candidate Set by means of a simple state machine. A pilot promoted to the Pre-candidate Set starts in state 2. Each time the pre-candidate pilot (i.e., the recently promoted pilot) is scanned and the measured energy is above T_ADD, the state of the pre-candidate pilot is incremented. When the pre-candidate pilot is scanned and its measured energy is below T_ADD, its state is decremented. When the corresponding state reaches 5, the pre-candidate pilot is promoted to the Candidate Set. When the corresponding state reaches 0, the pre-candidate pilot is demoted to the Neighbor Set.

IS-95 specifies that the mobile station shall support an Active set of size 6, a Candidate Set of size 5, and a Neighbor Set of size 20. These are the minimum set sizes that must be supported. When there are several active, candidate, and pre-candidate pilots in their respective sets, neighbor pilots are scanned relatively infrequently. For example, when there is a total of 3 active and candidate pilots and 20 neighbor pilots, the algorithm would result in more than 80 scans between scans of the same neighbor pilot. At 15 milliseconds (ms) per scan, this results in 1.2 seconds between scans of the same neighbor pilot. This is unacceptable because IS-98, the mobile station performance specification for CDMA, specifies that the mobile station must promote an acceptable pilot from the Neighbor Set to the Candidate Set in no more than 800 ms.

The mobile station must quickly determine which neighbor pilots to promote to the Candidate Set to ensure that the strongest pilots will remain in the Active Set. For example, in a rapidly changing environment, such as when the mobile station goes around the corner of a large building, the active pilots may be rapidly shadowed, and the measured energy of a neighbor pilot may change from very weak to very strong. If the mobile station is not able to promote the new strong neighbor to the Candidate Set quickly enough, i.e., before communication on the active pilots is lost, then the call will "drop." This phenomenon has been termed "Rapid Changing Pilot" problem.

A need therefore exists for a method of and apparatus for significantly improving the mobile station's performance in a rapidly changing environment by maintaining the Pilot Set in such a manner that the strong pilots are quickly determined and promoted to the Candidate Set.

BRIEF DESCRIPTION OF THE DRAWINGS

FIG. 2 illustrates a flow chart of a method of pilot set maintenance carried out by the wireless communication device.

DESCRIPTION OF THE PREFERRED EMBODIMENTS

Figure 1:
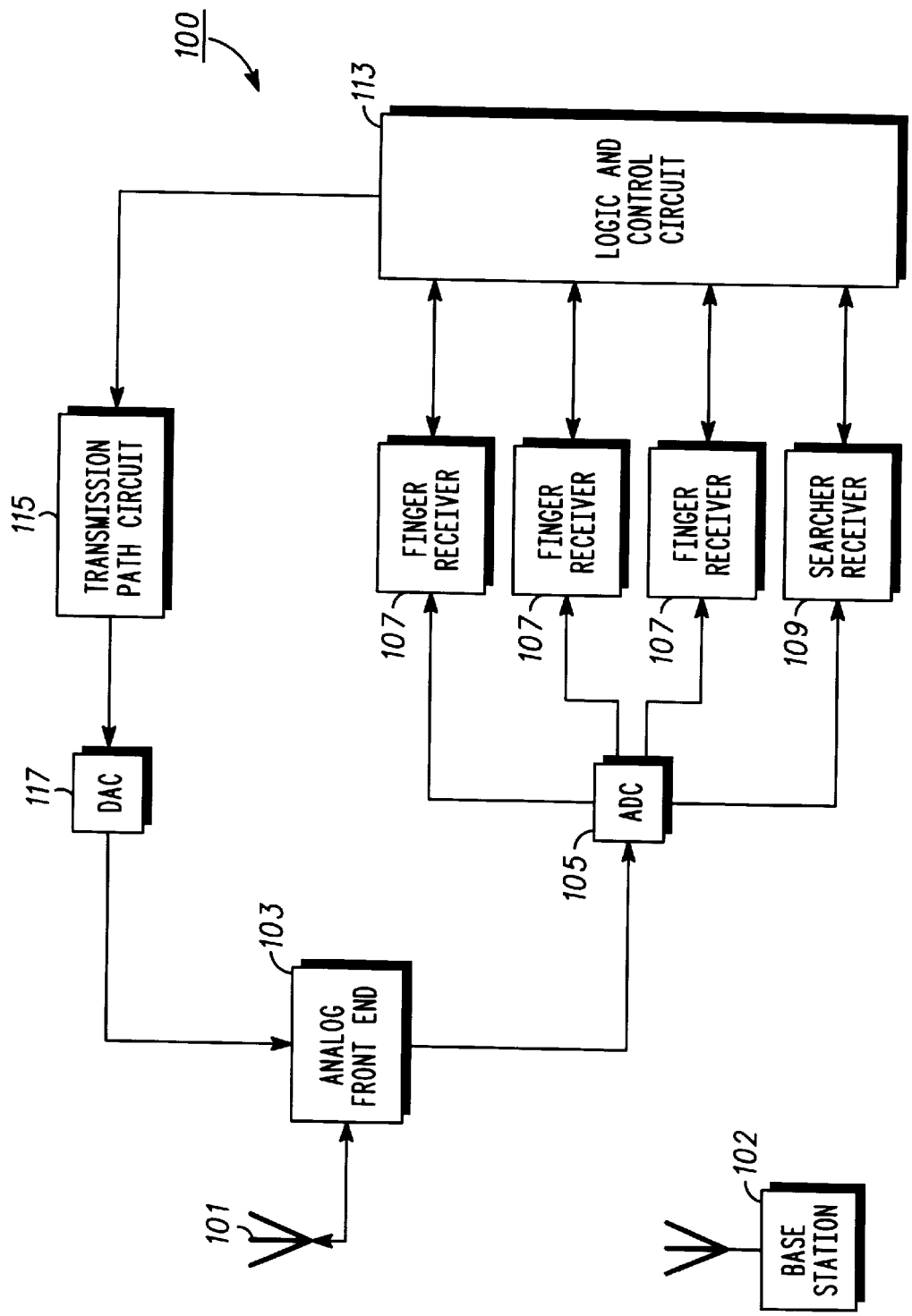
FIG. 1 illustrates an electrical block diagram of a wireless communication device.

The method and apparatus described herein maintains the Pilot Set of a wireless communication device, such as a portable radiotelephone, that is operating in a CDMA system. The method and apparatus significantly improves the device's performance in a rapidly changing environment by quickly and reliably determining and promoting strong neighbor pilots to the Candidate Set.

In accordance with one aspect of the invention, strong neighbor pilots are determined by scanning the Active Set, scanning the Candidate Set after scanning the Active Set, and scanning at least a subset of the Pre-candidate Set and the Neighbor Set after scanning the Candidate Set. The pilots of the Pre-candidate Set and the Neighbor Set are scanned until an initiation event occurs, such as, a predetermined time duration expires since commencement of the scan of the Active Set. When the initiation event occurs, the method begins again and continues until the next initiation event occurs.

In accordance with another aspect of the invention, when more than one pre-candidate pilots are in the Pre-Candidate Set, the pre-candidate pilots are successively scanned until all but one pre-candidate pilot has been promoted to the Candidate Set or demoted to the Neighbor Set. Thus, the pre-candidates are given priority over the Neighbor Set so that an ultimate determination of promoting the pre-candidate pilot can be made sooner.

In accordance with a further aspect of the invention, when a single pre-candidate pilot is in the Pre-Candidate Set, the pre-candidate pilot and successive neighbor pilots are alternately scanned, without intervening scans of the Active Set or Candidate Set. Consequently, more neighbor pilots are scanned, and scanned more often, than in the conventional art.

Additional advantages and novel features of the invention will be set forth in part in the description which follows, wherein embodiments of the invention are shown and described, and in part become apparent to those skilled in the art upon examination of the following detailed description or may be learned by practice of the invention.

Reference will now be made in detail to an embodiment configured according to the present invention.

FIG. 1 is an electrical block diagram of a wireless communication device, e.g., a radiotelephone 100, that can employ the method according to the invention. This figure illustrates, among other things, an antenna 101 for receiving signals from base stations 102 (only one shown) and transmitting signals originated by radiotelephone 100. An analog front end 103 processes the received signals and provides them to an analog-to-digital converter (ADC) 105. The digitized received signals are provided to a rake receiver comprised of a plurality of finger receivers 107 and at least one searcher receiver 109 connected in parallel. The operation of the finger receivers and search receiver is controlled in part by a logic and control circuit 113. The output of the finger receivers and search receiver is provided to the logic and control circuit 113 for further processing. Logic and control circuit 113 also provides data to a transmission circuit path 115, which processes the data and provides the processed data to a digital-to-analog circuit (DAC) 117. The analog signal output by DAC 117 is provided to analog front end 103 for transmission to base stations 102 via antenna 101. An example of the rake receiver and transmission circuit path 115 is the Mobile Station Modem available from Qualcomm, Inc.

Although logic and control circuit 113 is shown as a separate element from the receivers, one of ordinary skill will recognize that portions of the logic and control circuit may reside in the receivers.

When radiotelephone 100 is awake, antenna 101 receives from the active pilot the Pilot Set. Searcher receiver 109 is capable of sweeping the pilot channel signals of the Pilot Set to determine the pilot channel strength of each. Searcher receiver 109 determines pilot channel strength by a complex correlation process which provides a measure of $E_c/I_o$ in decibels (dB), where $E_c$ is a measure of the pilot energy and $I_o$ is the total power spectral density in the received bandwidth.

Logic and control circuit 113 is capable of storing the data and the software program specifying the instructions for executing the method according to the invention.

The method of use and operation of the wireless communication device as constructed and described above will now be described with reference to FIG. 2, which is a flow chart illustrating a method 200 of pilot set maintenance performed by the wireless communication device.

Upon occurrence of an initiation event, such as, expiration of a predetermined time duration or receipt of the Pilot Set from the base station, the method is initiated. At any point during the execution of the steps of the method, an occurrence of an initiation event will interrupt the method and cause it to re-initiate.

Upon initiation of the method, the step of scanning all of the active pilots of the Active Set is commenced. (Step 203.) Simultaneous with commencement of the scan of the Active Set, logic and control circuit 113 starts a timer to measure a predetermined time duration and its expiration. (Step 201.) The predetermined time duration is chosen to ensure that the Active Set is scanned often enough for proper finger management. Upon completion of the scan of the Active Set, the candidate pilots of the Candidate Set are scanned. (Step 205.) Control of the method then is determined by whether there is at least one pre-candidate pilot in the Pre-Candidate Set. (Step 207.) When there is at least one pre-candidate pilot, a determination is made as to whether there is more than one pre-candidate pilot in the Pre-Candidate Set. (Step 209.) When there is more than one pre-candidate pilot in the Pre-Candidate Set, the pre-candidate pilots are continuously scanned, one after the other, and when the state of any of the pre-candidate pilots specifies a demotion to the Neighbor Set or a promotion to the Candidate Set, the promotion or demotion immediately occurs without interrupting the order that pre-candidate pilots are scanned. The pre-candidate pilots are scanned until all but one pre-candidate pilot has been promoted or demoted, thus leaving a single pre-candidate pilot in the Pre-Candidate Set. (Step 211.)

This is an important aspect of the invention because it ensures that, at this stage of the method, there will be a time lag between successive scans of the same pre-candidate pilot. The time lag allows avoidance of errors in the energy measurement when consecutive scans of the same pilot signal are made in the presence of Rayleigh fading. Accordingly, strong neighbor pilots that have been promoted to the Pre-candidate Set can rapidly and more reliably be promoted or demoted due the greater frequency and accuracy in energy measurements.

IS-95 specifies that when a pilot is added to the Candidate Set, as can occur in step 211, the radiotelephone generates and sends a Pilot Strength Measurement Report Message specifying the Candidate Set. As a result, the base station may send a Handoff Direction Message specifying an Active Set that is different from the set currently stored in the radiotelephone. Receipt of such a Handoff Direction Message could be considered an initiation event, causing re-initiation of the method.

When a single pre-candidate pilot remains in the Pre-Candidate Set after the scan of multiple pre-candidate pilots, the one pre-candidate pilot and neighbor pilots of the Neighbor Set are alternately scanned in successive order. For example, when there are two neighbor pilots, the pre-candidate pilot would be scanned, then the first neighbor pilot would be scanned, then the pre-candidate pilot would again be scanned.

This is an important aspect of the invention because a time lag is maintained between successive energy measurements of the single pre-candidate pilot. Moreover, more neighbor pilots than in the conventional art can be scanned by eliminating the re-scan of the Active and Candidate Sets, and each pre-candidate pilot of the Pre-Candidate Set, between each scan of a successive neighbor pilot.

The alternate scanning would continue until either (1) a one of the neighbor pilots is promoted to the Pre-Candidate Set when its measured energy is above T_ADD, (2) the one pre-candidate pilot is promoted to the Candidate Set or demoted to the Neighbor Set, or (3) all of the neighbor pilots have been scanned. (Step 213.)

A determination is made as to whether a one of the neighbor pilots had been promoted to the Pre-Candidate Set, thus causing the alternate scanning to terminate. (Step 215.) When a one of the neighbor pilots is promoted, there are now two pre-candidate pilots in the Pre-Candidate Set. Because there are multiple pre-candidate pilots, the pre-candidate pilots are again scanned until all but one pre-candidate pilot has been promoted or demoted, thus leaving a single pre-candidate pilot in the Pre-Candidate Set. (Step 211.)

When a one of the neighbor pilots is not promoted, a determination is made as to whether the one pre-candidate pilot is promoted or demoted, thus causing the alternate scanning to terminate. (Step 217.) When the one pre-candidate pilot is promoted or demoted, there are no pre-candidate pilots in the Pre-Candidate Set. Consequently, the neighbor pilots are scanned successively until a one of the neighbor pilots is promoted to the Pre-candidate Set or all of the neighbor pilots have been scanned. (Step 219.)

As an example of the successive scanning of the neighbor pilots after the one pre-candidate pilot is promoted or demoted, assume there are three neighbor pilots. Also assume that the second neighbor pilot was last scanned before the pre-candidate pilot was promoted or demoted. The next scan would be of the third neighbor pilot, then the first neighbor pilot, then the last scan would be of the second neighbor pilot. At this point, all of the neighbor pilots have been scanned.

A neighbor pilot, however, could be promoted before all of the neighbor pilots have been scanned. Therefore, a determination is made as to whether a one of the neighbor pilots has been promoted to the Pre-Candidate Set, thus causing the scan of the Neighbor Set to terminate. (Step 221.) When one of the neighbor pilots has been promoted, there is now one pre-candidate pilot in the Pre-Candidate Set that can be alternately scanned with the Neighbor Set. Thus the one pre-candidate pilot and neighbor pilots of the Neighbor Set are alternately scanned in successive order. (Step 213.) Once again, the scan of the neighbor pilot in Step 213 would commence with the neighbor pilot following the last-scanned neighbor pilot.

When the scan of the neighbor pilots is terminated because all of the neighbor pilots have been scanned, there are no neighbor pilots at this stage strong enough to promote. Therefore a remaining pilot of the Remaining Set is scanned, (step 223), and a determination is made as to whether the remaining pilot has been promoted because its measured energy exceeds T_ADD, (step 225). Remaining pilots are scanned in successive order, scanning the remaining pilot following the last-scanned remaining pilot.

When the remaining pilot has not been promoted, the neighbor pilots are re-scanned successively until a one of the neighbor pilots is promoted or all of the neighbor pilots have been scanned. (Step 219.) When the remaining pilot has been promoted, there is now one pre-candidate pilot in the Pre-Candidate Set that can be alternately scanned with the Neighbor Set. Thus the one pre-candidate pilot and neighbor pilots of the Neighbor Set are alternately scanned. (Step 213.)

Referring now to Step 217, the third condition that can terminate the alternate scanning of the one pre-candidate pilot and neighbor pilots is when all of the neighbor pilots have been scanned. In this situation, after the last neighbor pilot has been scanned and a neighbor pilot has not been promoted, (step 215), nor the one pre-candidate pilot has been promoted or demoted, (step 217), a remaining pilot is scanned. (Step 227.)

A determination is then made as to whether the remaining pilot has been promoted. (Step 229.) When the remaining pilot has been promoted, there are now two pre-candidate pilots in the Pre-Candidate Set, and the pre-candidate pilots are again scanned until all but one pre-candidate pilot has been promoted or demoted. (Step 211.) When the remaining pilot has not been promoted, only one pre-candidate exists and therefore the one pre-candidate pilot and neighbor pilots of the Neighbor Set are alternately scanned in successive order. (Step 213.)

Referring back to Step 207, after scanning the candidate pilots, when there is not at least one pre-candidate pilot of the Pre-candidate Set, the neighbor pilots are re-scanned successively until a one of the neighbor pilots is promoted or all of the neighbor pilots have been scanned. (Step 219.)

Finally, to complete the description of method 200, referring back to Step 209, when there is one pre-candidate pilot of the Pre-candidate Set, the one pre-candidate pilot and neighbor pilots of the Neighbor Set are alternately scanned in successive order. (Step 213.)

In summary, the described embodiment configured in accordance with the present invention provides an ordered method for scanning the Pilot Sets to obtain the advantage of reliably and quickly promoting strong pilots signals to the Candidate Set. Consequently, strong pilot signals are reported to the base station earlier and more often than in the conventional art; and, the Active Set can be updated in a timely manner that mitigates the number of dropped calls in a rapidly changing environment.

Those skilled in the art will recognize that various modifications and variations can be made in the apparatus and method of the present invention without departing from the scope or spirit of this invention. As examples, in Step 211, it may be desirable to scan the pre-candidate pilots until two instead of one pre-candidate pilot has been promoted or demoted, because successive scans of the same pilot may require a time delay of two scans where the searcher receiver is especially fast in doing its scans. Thus in step 213, the alternate scanning would be the first pre-candidate pilot, the second pre-candidate pilot, and then a neighbor pilot. Or the required time delay may be provided by scanning the pre-candidate pilots until one pre-candidate pilot remains in the Pre-candidate Set, and then scan two instead of one neighbor pilots.

What is claimed is:

1. A method of maintaining a Pilot Set in a digital communication system that utilizes Code Division Multiple Access, the Pilot Set including an Active Set of active pilots, a Candidate Set of candidate pilots, a Pre-candidate Set of pre-candidate pilots, and a Neighbor Set of neighbor pilots, the method comprising the steps of:

scanning the entire Active Set of active pilots;

scanning the entire Candidate Set of candidate pilots after scanning the entire Active Set; and scanning the pre-candidate pilots without intervening scans of the active pilots or candidate pilots until all but a predetermined number of pre-candidate pilots have been promoted to the Candidate Set or demoted to the Neighbor Set.

2. The method of claim 1 further comprising the step of alternately scanning the predetermined number of pre-candidate pilots and the neighbor pilots.

3. The method of claim 2, wherein the predetermined number of pre-candidate pilots and the neighbor pilots are alternately scanned until one of the neighbor pilots is promoted to the Pre-candidate Set.

4. The method of claim 3, wherein the step of scanning the pre-candidate pilots until all but a predetermined number of pre-candidate pilots have been promoted to the Candidate Set or demoted to the Neighbor Set is repeated when a one of the neighbor pilots is promoted to the Pre-Candidate Set.

5. The method of claim 2, wherein the predetermined number of pre-candidate pilots and the neighbor pilots are alternately scanned until a one of the predetermined number of pre-candidate pilots is promoted to the Candidate Set or demoted to the Neighbor Set.

6. The method of claim 5 further comprising the step of scanning the neighbor pilots until a one of the neighbor pilots is promoted to the Pre-candidate Set or all of the neighbor pilots have been scanned, when the one of the predetermined number of pre-candidate pilots has been promoted to the Candidate Set or demoted to the Neighbor Set.

7. The method of claim 6, wherein the step of alternately scanning the predetermined number of pre-candidate pilots and the neighbor pilots is repeated when the one of the neighbor pilots has been promoted.

8. The method of claim 6, the Pilot Set further includes a Remaining Set of remaining pilots, the method further comprises the step of scanning a remaining pilot when all of the neighbor pilots have been scanned.

9. The method of claim 8, wherein the step of scanning the neighbor pilots until a one of the neighbor pilots is promoted to the Pre-candidate Set or all of the neighbor pilots have been scanned is repeated when the remaining pilot has not been promoted to the Pre-candidate Set.

10. The method of claim 7, wherein the step of alternately scanning the predetermined number of pre-candidate pilots and the neighbor pilots is repeated when the remaining pilot has been promoted to the Pre-candidate Set.

11. The method of claim 2 wherein the predetermined number of pre-candidate pilots and the neighbor pilots are alternately scanned until all of the neighbor pilots have been scanned.

12. The method of claim 11, the Pilot Set further includes a Remaining Set of remaining pilots, the method further comprises the step of scanning a remaining pilot when all of the neighbor pilots have been scanned.

13. The method of claim 12, wherein the step of scanning the pre-candidate pilots until all but predetermined number of pre-candidate pilots have been promoted to the Candidate Set or demoted to the Neighbor Set is repeated when the remaining pilot has been promoted to the Pre-candidate Set.

14. The method of claim 12, wherein the step of step of alternately scanning the predetermined number of pre-candidate pilots and the neighbor pilots is repeated when the remaining pilot has not been promoted to the Pre-candidate Set.

15. A method of maintaining a Pilot Set in a digital communication system that utilizes Code Division Multiple Access, the Pilot Set including an Active Set of active pilots, a Candidate Set of candidate pilots, a Pre-candidate Set of pre-candidate pilots, and a Neighbor Set of neighbor pilots, the method comprising the steps of:

(a) scanning the entire Active Set;

(b) scanning the entire Candidate Set after scanning the entire Active Set;

(c) scanning at least a subset of the Pre-candidate Set and the Neighbor Set without intervening scans of the Active Set or the Candidate Set after scanning the entire Candidate Set, until an initiation event occurs; and (d) repeating steps (a) through (c) when the initiation event occurs.

16. The method of claim 15, wherein step (c) further comprises the substep of scanning the Pre-candidate Set until all but a predetermined number of pre-candidate pilots have been promoted to the Candidate Set or demoted to the Neighbor Set.

17. The method of claim 16, wherein step (c) further comprises the substep of alternately scanning the predetermined number of pre-candidate pilots and the neighbor pilots.

18. The method of claim 15, wherein the initiation event is the expiration of a predetermined time duration that commences upon initiating step (a).

19. An apparatus for maintaining a Pilot Set in a digital communication system that utilizes Code Division Multiple Access, the Pilot Set including an Active Set of active pilots, a Candidate Set of candidate pilots, a Pre-candidate Set of pre-candidate pilots, and a Neighbor Set of neighbor pilots, the apparatus comprising:

a logic and control circuit for providing instructions; and a searcher receiver, responsive to the instructions, to sequentially scan the entire Active Set of active pilots, then the entire Candidate Set of candidate pilots, and then the pre-candidate pilots without intervening scans of the Active Set or Candidate Set, wherein the scan of the pre-candidate pilots continues until all but a predetermined number of pre-candidate pilots have been promoted to the Candidate Set or demoted to the Neighbor Set.

20. The apparatus of claim 19, wherein the searcher receiver alternately scans the predetermined number of pre-candidate pilots and the neighbor pilots.

21. The apparatus of claim 20, wherein the searcher receiver terminates alternate scans of the predetermined number of pre-candidate pilots and the neighbor pilots when a one of the neighbor pilots is promoted to the Pre-candidate Set, and resumes the scan of the pre-candidate pilots.

* * * * *